(12) United States Patent
Miller et al.

(10) Patent No.: US 6,266,185 B1
(45) Date of Patent: Jul. 24, 2001

(54) BINOCULAR TELESCOPE

(75) Inventors: Benno Miller, Innsbruck; Erwin Murg; Ludwig Pernstich, both of Rum, all of (AT)

(73) Assignee: Swarovski Optik KG, Absam (AT)

( * ) Notice: Subject to any disclaimer, the term of this patent is extended or adjusted under 35 U.S.C. 154(b) by 0 days.

(21) Appl. No.: 09/312,960

(22) Filed: May 17, 1999

(30) Foreign Application Priority Data

May 18, 1998 (EP) .................................................. 98109203

(51) Int. Cl.$^7$ .................................................. G02B 23/00
(52) U.S. Cl. ........................ 359/407; 359/412; 359/413; 359/418; 359/480
(58) Field of Search .................................... 359/402, 412, 359/413–418, 480

(56) References Cited

U.S. PATENT DOCUMENTS

| 1,022,340 | * | 4/1912 | Steinle | 359/413 |
| 4,436,387 | * | 3/1984 | Shimizu | 359/418 |
| 4,989,963 | * | 2/1991 | Farnung et al. | 359/414 |

* cited by examiner

Primary Examiner—Darren Schuberg
Assistant Examiner—Fayez Assaf
(74) Attorney, Agent, or Firm—Fulbright & Jaworski

(57) ABSTRACT

A pair of binoculars includes a compact focusing mechanism providing an open reach-through space between the body tubes of the binoculars with an enhanced area for the user to grasp and hold each body tube. The focusing mechanism further provides for adjustment of the body tube spacing without affecting focusing. The focusing mechanism includes a compact focusing knob structure situated on an outside of an articulated bridge connecting the body tubes and used for adjusting and maintaining a desired distance between the tubes. The focusing mechanism includes respective arms extending from the focusing knob to each of the body tubes, the ends of the levers riding on the inside of a conically shaped plunger coaxial with a pivot point of the bridge so that adjusting a spacing between the body tubes does not affect focusing. When positioned inwardly, the focusing knob produces a longitudinal movement of the plunger to effect focusing of both focusing elements simultaneously. When pulled out, the focusing knob causes movement of an eccentric used to radially translate a pivot point of one or both of the levers thereby effecting the position of the single focusing element and providing a diopter adjustment. If desired, a second pivoted bridge may be included, longitudinally spaced from the first bridge along the body tubes so that a substantially contiguous opening is provided for grasping of the binoculars. The binoculars may use a variety of optical components including roof prisms, Porro prisms or be configured as field glasses.

19 Claims, 3 Drawing Sheets

BINOCULAR TELESCOPE

BACKGROUND OF THE INVENTION

1. Field of the Invention

This invention relates to binoculars having a focusing mechanism mounted on the outside of a rearmost bridge connecting the body tubes and particularly to a focusing mechanism including a gear extending to each tube through the bridge and in which focusing is not affected by adjustments made to the distance between the tubes.

2. Description of the Related Technology

DE-PS 154 142 discloses binoculars having two spaced articulably jointed bridges connected to a pair of body tubes housing the optical components of the binoculars. Since the bridges are not connected by a center axle, an open space is formed between the two body tubes and the connecting bridges so that one tube can be enclosed by the user's hand. This reach-through ensures safe handling of the binoculars and in particular considerably facilitates holding and carrying the binoculars with one hand.

In conventional binoculars, the focusing mechanisms are formed by mounting the eyepieces in tubular inserts telescopically displaceable within the binocular's body tubes. These tubular inserts have external toothing, and an internal thread for displacement in the longitudinal direction of the tube. The external toothings are engaged by intermediate gearwheels mounted on the bridge and seated on each of two focusing knobs mounted concentrically and in tandem.

When the body tubes in conventional binoculars are swivelled around the joint axis the focus necessarily changes due to the relative rotation of the gear-wheels and focusing knobs. Conventional binoculars are therefore extremely difficult to handle. In addition, focusing must be effected by simultaneous rotation of the two focusing knobs mounted closely in tandem, which is also difficult.

An alternative binocular focusing scheme uses a hollow double-jointed bridge in which a central focusing device is mounted for operating the focusing mechanism via a gear. The focusing mechanism is mounted in sleeves within the tubes, this configuration known as internal focusing (cf. e.g. DE 39 29 825 C1). Due to the large bridge required to handle this focusing structure, conventional binoculars do not permit a user to reach through between the body tubes. The binoculars are also considered to be unwieldy due to the wide, hollow jointed bridge and the heavy gearing substantially filling said bridge.

Accordingly, there exists a need for a light, easy-to-handle binocular type telescope.

SUMMARY OF THE INVENTION

This invention relates to binoculars and, more particularly, to binoculars having two body tubes connected via at least one jointed bridge for adjusting the distance between the eyes, both tubes having axially displaceable focusing means operated by a common focusing knob mounted on the jointed bridge engaging respective gears extending through the jointed bridge.

In order to facilitate handling, the binoculars according to the invention have two jointed bridges disposed a distance apart without a center axle provided therebetween. In addition, the gear for operating the focusing mechanism is displaceable in the longitudinal direction of the tube and is formed so that focusing is effected independently of the adjustment of the distance between the eyepieces, i.e., independently of the change of the angular position of the jointed bridges. Furthermore, handling of the binoculars is facilitated since focusing mechanisms for both of the binocular telescopes are operated by a common focusing knob.

The binoculars according to the invention include an extremely space-saving gear for operating the focusing mechanism. This feature of the invention provides for a jointed bridge which is narrow enough that it can be spaced sufficiently far from the other jointed bridge and without a center axle therebetween so as to provide a reach-through. The space-saving gear preferably has one two-armed, preferably angular, lever acting upon each of the two focusing mechanisms and swiveling about an axis extending perpendicular to the longitudinal direction of the binoculars, engaging one end of the particular focusing mechanism. The end of the angle lever opposite the focusing mechanism acts upon a stop axially displaceable by rotation of the focusing knob and which is preferably formed as a conical surface. A screw thread is provided within the focusing knob for axial displacement of this stop or support and thus for operation of the angle levers for displacing the focusing mechanisms.

For diopter adjustment, one of the two levers can be formed to be radially displaceable by a further gear independently of the other lever. This gear can be formed, for example, by an eccentric operated by the focusing knob axle, and a coupler between the eccentric and the radially displaceable lever. The focusing knob is preferably formed so that it can be used for both focusing, on the one hand, and diopter adjustment, on the other hand. It is thus axially displaceable between a focusing position and a diopter adjustment position. A focusing knob coupling permits both levers to move in the focusing position and only one lever to move in the diopter adjustment position. The coupling preferably has a coupling disk connected so as to rotate in unison with the focusing knob axle and connected so as to rotate in unison (i) at one face with the gear for axial displacement of the stop in the focusing position of the focusing knob axle, and (ii) at its opposite face with the eccentric shaft in the diopter adjustment position of the focusing knob axle. The focusing position is preferably the position of the focusing knob axle when fully inserted into the focusing knob housing, and the diopter adjustment position the position of the axle when pulled out of the focusing knob housing. The coupling disk is preferably connected with the focusing knob axle by a snap connection which connects the coupling disk with the gear for axial displacement of the stop when the focusing knob axle is inserted, and with the eccentric shaft when the axle is pulled out.

The two-armed levers for operating the focusing mechanism provide a relatively long sliding path for the focusing mechanisms within the body tubes. The binoculars thus have enhanced close focusing capabilities on the order of a few meters.

Although the above-described gear for operating the focusing mechanism is preferred, other gears and gearing arrangements may also be employed which provide focusing using a common focusing knob for both focusing the binoculars independent of the change of the distance between the body tubes, on the one hand, while providing a reach-through between two jointed bridges, on the other hand, e.g., a cardan gear.

The articulably jointed bridge including focusing gear can generally be made narrow and light-weight according to the invention. The invention is thus applicable to multiple uses beyond binoculars having two articulably jointed bridges, including those with and without a reach-through therebetween. For example, a single articulably jointed bridge can be used instead of two spaced bridges. Likewise, the binoculars can have two jointed bridges and a thin axle to provide a reach-through space.

The binoculars according to the invention can be formed using either roof (Dach) prisms, i.e., with substantially aligned objective and eyepiece axes, or Porro prisms, i.e., with the objective axes clearly offset from the two eyepiece axes.

These, together with other objects and advantages which will be subsequently apparent, reside in the details of construction and operation as more fully hereinafter described in the claims, with reference being had to the accompanying drawings forming a part thereof, wherein like numerals refer to like elements throughout.

DETAILED DESCRIPTION OF THE PREFERRED EMBODIMENT

Figure 1:
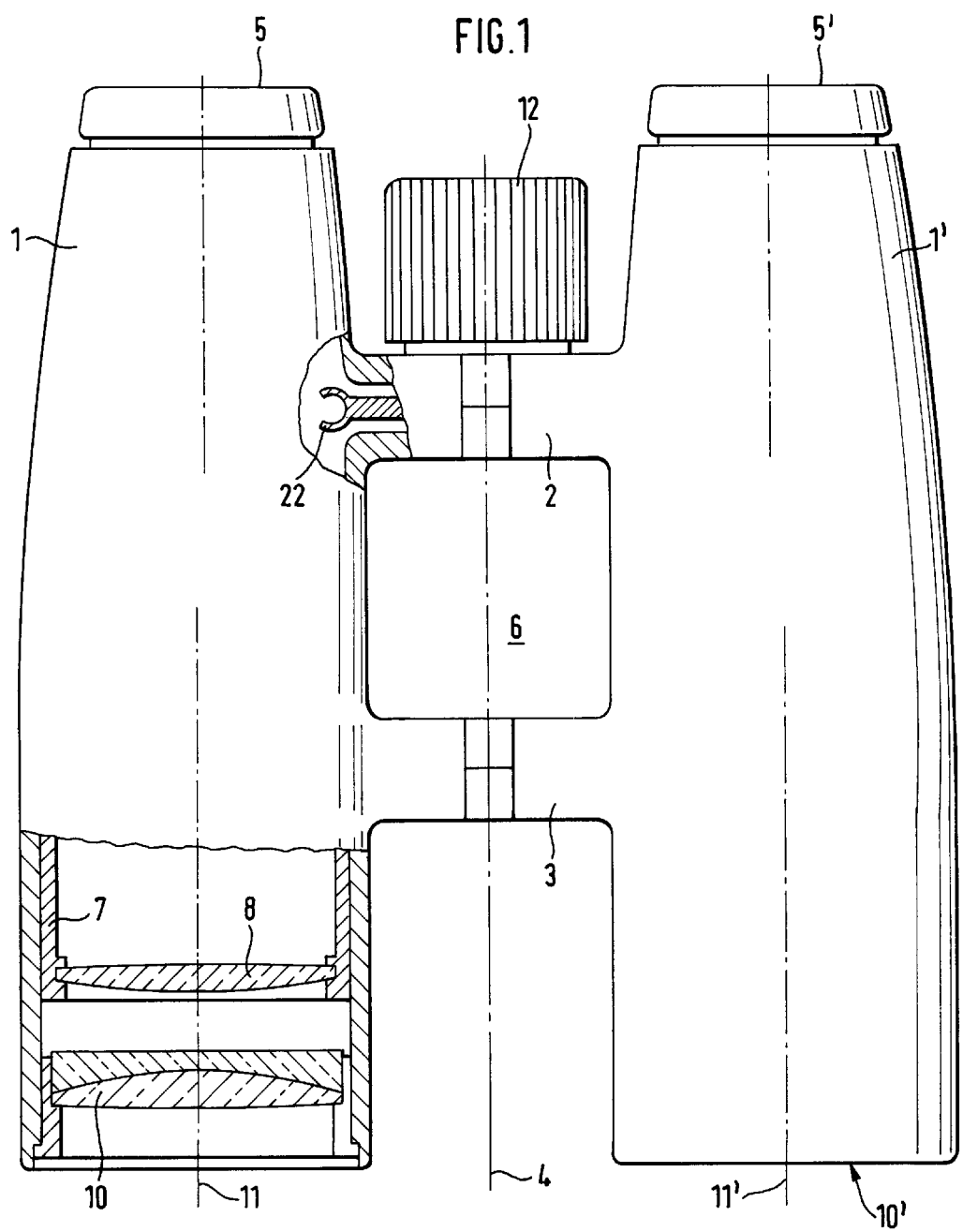
FIG. 1 a cut-away plan view showing binoculars according to the invention.

Referring to FIG. 1, the binoculars include two body tubes 1,1' swiveling through two articulably jointed rear and forward bridges 2,3 around longitudinal center axis 4 of the binoculars for adjusting the distance between the user's eyes, i.e., eyepieces 5,5'. Articulably jointed bridges 2,3 are disposed at a distance so as to form reach-through 6 therebetween, i.e., an open space, to permit each tube 1,1' to be enclosed by the user's hand.

The binoculars are formed with a roof prism (not shown), i.e., eyepieces 5,5' and objectives 10,10' lie in tube axis 11,11'. Alternatively, in a porro prism design, the axes of eyepieces 5,5' and the axes of objectives 10,10' might be offset in each body tube 1,1'.

The binoculars preferably use an internal focusing mechanism. That is, as shown for left tube 1 in FIG. 1, sleeve 7 is displaceably mounted along tube axis 11 within each tube 1,1' and between stationary eyepiece 5,5' and objective 10,10', the sleeve retaining focusing means, i.e., focusing lens 8. Focusing knob 12 is located on the rear side of articulably jointed bridge 2, facing eyepieces 5,5'. Focusing knob 12 is used to control an axial displacement of lens 8 within tubes 1,1'. A gear inside of articulably jointed bridge 2 converts the rotational motion of focusing knob 12 into an axial displacement of lens 8.

Figure 2:
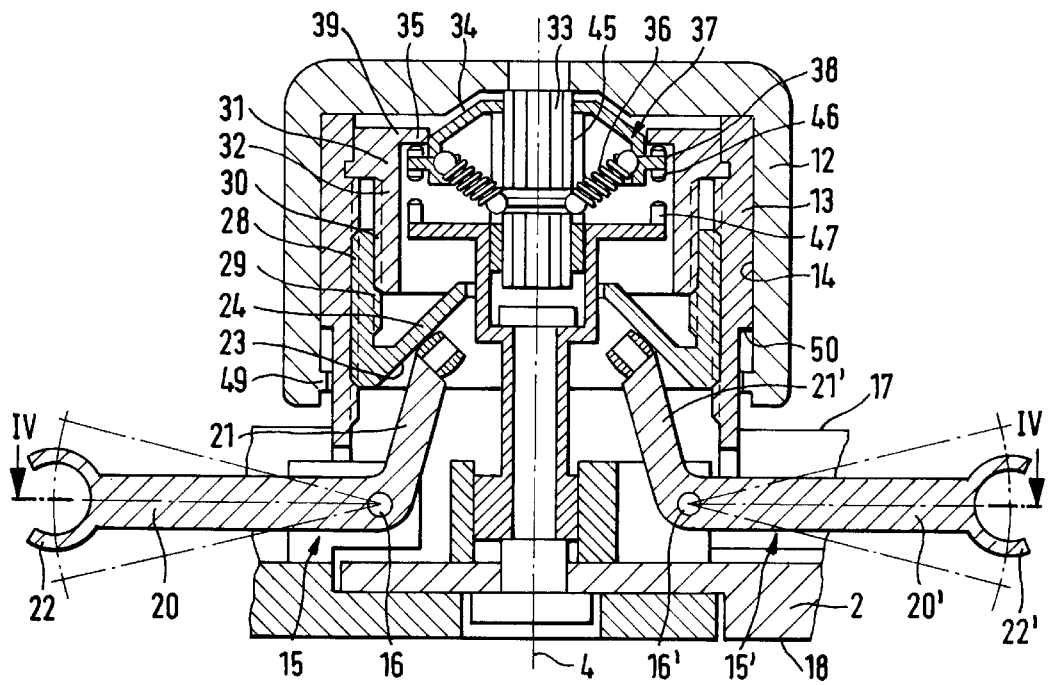
FIG. 2 is a sectional view through the rear articulably jointed bridge of the binoculars of FIG. 1 showing detail of the focusing gear mechanism in the forward focusing position.
Figure 3:
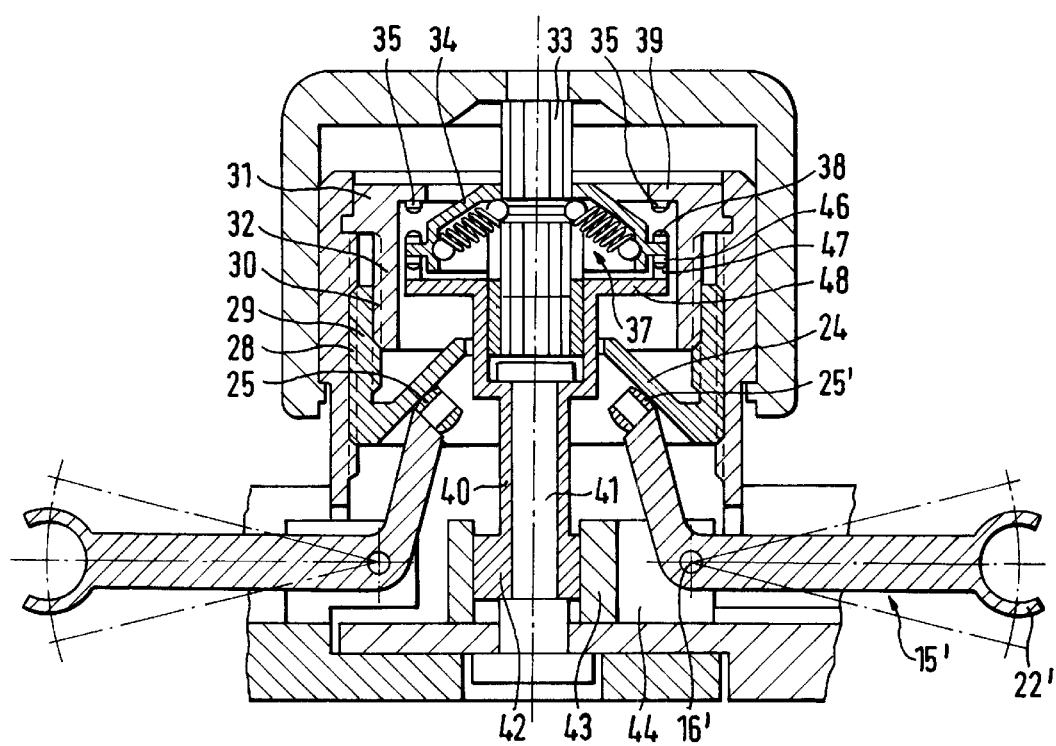
FIG. 3 is a sectional view through the rear articulably jointed bridge of the binoculars of FIG. 1 showing detail of the focusing gear mechanism in the extended diopter adjustment position.

Referring to FIGS. 2 and 3, cylindrical housing 13 is located on rear bridge 2 concentrically with the longitudinal axis of the binoculars or articulably jointed bridge rotation axis 4. Focusing knob 12 is pivoted with its inner wall 14 sliding over and across housing 13. A gear for converting a rotation of focusing knob 12 into an axial displacement of lens 8 within both body tubes 1,1' includes respective double-arm levers 15,15'. Double-arm levers 15,15' engage and displace respective sleeves 7 by swiveling or rotating around respective vertical axes 16,16' extending perpendicular longitudinal axis 4. (Note: The term "gear" is used herein and in the claims in its broadest sense to include any system of moving parts transmitting motion including, but not limited to, levers, gear wheels, cams, gear clusters, eccentrics, etc.)

Rearmost articulably jointed bridge 2 has two end walls 17,18. Levers 15,15' are formed as angle levers, one lever arm 20,20' which is hinged at its end to sleeve 7, extending substantially perpendicular to tubes 1,1. The other lever arm 21,21' is angled rearward, i.e., toward focusing knob 12. The joint connecting lever arm 20,20' with sleeve 7 can be formed as fork 22,22' for engaging a pin or the like (not shown) on sleeve 7.

The end of lever arm 21,21' farthest from lens 8 engages conical surface 23 of annular stop 24 or support, through springs (not shown) which urge end 25,25' of lever arm 21,21' against conical surface 23. Conical surface 23 tapers away from bridge 2 toward focusing knob axle 33.

Annular stop 24 is axially displaceable and is fastened to sleeve 29 which cooperates with thread 28 on inside housing wall 13. Rotation of stop 24 causing its axial displacement is effected by a gear consisting of splining 30 on sleeve 29 and inside sleeve 31 with splining 32. Bell-shaped coupling disk 34 extends from focusing knob 12 into housing 13 and is disposed coaxially with joint axis 4 for connecting helical gear 28 to 32 to rotate in unison with focusing knob axle 33. Bell-shaped coupling disk 34 has a rearward facing surface shaped to engage with inside sleeve 31 of helical gear 28 to 32. The surfaces can consist, e.g., of radial serration 38 on the face of coupling disk 34 which is engaged by pins or similar projections 35 provided on flange 39 on inside sleeve 31 of helical gear 28 to 32.

Coupling disk 34 engages splining 45 on focusing knob axle 33 so as to rotate together with focusing knob axle 33. The axial positioning of coupling disk 34 against focusing knob axle 33 is provided by snap connection 37 consisting, e.g., of a plurality of springs 36. Spring element 36 or snap connection 37 is thus jointed or articulated at its outer end or edge with coupling disk 34 and at its inner end or edge with focusing knob axle 33.

To focus the binoculars a user rotates focusing knob 12 with it in the forward or inward position as shown in FIG. 2. The rotation of focusing knob 12 is transmitted from focusing knob axle 33 directly onto coupling disk 34 and projections 35 engaging coupling disk 34 onto helical gear 28 to 32. Helical gear 28 to 32 converts the rotational movement into an axial displacement of stop 24. Axial displacement of stop 24 results in a corresponding rotation of lever arms 21,21' about vertical axes 16,16', with their opposite ends 25,25' axially displacing lens 8.

Since ends 25,25' of angle levers 15,15' slide on conical stop 23 when tubes 1,1' are swivelled around axis 4 so as to adjust the distance between the eyepieces, focusing is not affected as a result of adjusting the distance between the eyepieces of the binoculars.

Figure 4:
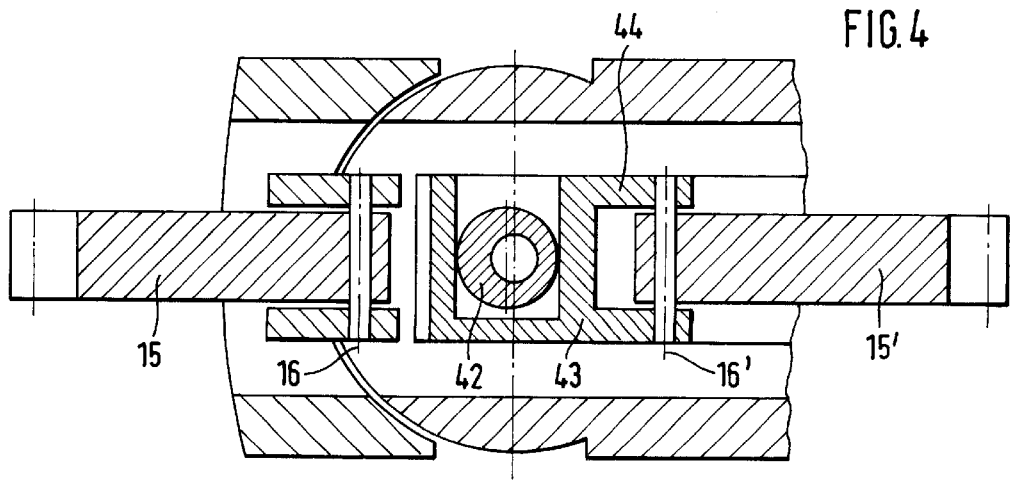
FIG. 4 is a sectional view through the coupler for diopter adjustment along cut-line IV—IV of FIG. 2.

Angled lever 15' (on the right in FIGS. 2 and 3) is radially displaceable with respect to focusing knob axle 33 or joint axis 4 for making diopter adjustments. Shaft 40 is thus pivoted on pin 41 coaxially with focusing knob axle 33. Shaft 40 includes eccentric 42 (FIG. 4) which engages coupler 43, the other end of which is formed, for example, as fork 44. Angled lever 15' is pivotedly connected to fork 44 at swivel axis 16'. Rotation of eccentric 42 swivels angled lever 15' around the point at which end 25' lies against stop or support 24, thereby axially displacing fork 22' and adjusting the axial position of lens 8' (not shown) within tube 1'.

Shaft 40 with eccentric 42 is connected to rotate together with focusing knob axle 33 when focusing knob 12 is in its rearward or extended position (FIG. 3). Coupling disk 34 is thus displaced by snap connection 37, which is supported against focusing knob axle 33 when focusing knob 12 is extended rearward. In this rearward extended position, radial serrations 38 of coupling disk 34 are disengaged from projections 35 of flange 39 on helical gear 28 to 32 and instead engage shaft 40. The engagement of coupling disk 34 with shaft 40 is provided by the cooperation of radial serration 46 on the other face of coupling disk 34, i.e., the one facing bridge 2, engaged by pins or similar projections 47 fastened to flange 48 on shaft 40. Focusing knob 12 is kept in the extended diopter adjustment position by snap element 37. Projection 49 is provided on the inner side of the focusing knob and cooperates with stop 50 on housing 13 to limit the rearward travel of the knob.

It will be readily seen by one of ordinary skill in the art that the present invention fulfills all of the objects set forth above. After reading the foregoing specification, one of ordinary skill will be able to effect various changes, substitutions of equivalents, and various other aspects of the invention as broadly disclosed herein. It is therefore intended that the protection granted herein be limited only by the definition contained in the appended claims and equivalents thereof.

What is claimed is:

1. Binoculars comprising:
   first and second body tubes connected by first and second jointed bridges swiveling around a joint axis and longitudinally spaced apart along said body tubes without connection by a center axle so as to form a reach-through;
   a focusing knob;
   first and second focusing elements axially displaceable within respective ones of said first and second body tubes by said focusing knob; and
   a gear passing from said focusing knob to said first and second focusing elements through one of the first and second jointed bridges such that adjustment of a distance between said first and second body tubes by said swiveling of said first and second jointed bridges does not cause an axial displacement of said first and second focusing elements,
   wherein said focusing knob is selectively operable to (i) cause a simultaneous axial displacement of both said first and second focusing elements and (ii) cause an axial displacement of only one of said first and second focusing elements.

2. Binoculars comprising:
   first and second body tubes connected by first or second jointed bridges swiveling around a joint axis and longitudinally spaced apart along said body tubes without connection by a center axle so as to form a reach-through;
   a focusing knob;
   first and second focusing elements axially displaceable within respective ones of said first and second body tubes by said focusing knob; and
   a gear passing from said focusing knob to said first and second focusing elements through one of the first and second jointed bridges such that adjustment of a distance between said first and second body tubes by said swiveling of said first and second jointed bridges does not cause an axial displacement of said first and second focusing elements,
   wherein said gear comprises first and second two-armed levers acting upon respective ones of said first and second focusing elements and provided in said one of said first and second jointed bridges.

3. Binoculars comprising:
   a pair of tubes connected by at least one jointed bridge for adjusting a distance between said tubes;
   a focusing knob;
   focusing elements axially displaceable within each of said tubes; and
   focusing gears passing from said focusing knob to respective ones of said pair of tubes through said jointed bridge, said focusing gears (i) each having a two-armed lever acting upon respective ones of said focusing elements and (ii) each pivoted on the jointed bridge,
   wherein said focusing knob and said focusing gears act upon said focusing elements for focusing, and diopter adjustment of said binoculars.

4. Binoculars comprising:
   a pair of tubes connected by at least one jointed bridge for adjusting a distance between said tubes;
   a focusing knob;
   focusing elements axially displaceable within each of said tubes; and
   focusing gears passing from said focusing knob to respective ones of said pair of tubes through said jointed bridge, said focusing gears (i) each having a two-armed lever acting upon respective ones of said focusing elements and (ii) each pivoted on the jointed bridge,
   wherein each of said levers comprise an angle lever.

5. Binoculars comprising:
   a pair of tubes connected by at least one jointed bridge for adjusting a distance between said tubes;
   a focusing knob;
   focusing elements axially displaceable within each of said tubes; and
   focusing gears passing from said focusing knob to respective ones of said pair of tubes through said jointed bridge, said focusing gears (i) each having a two-armed lever acting upon respective ones of said focusing elements and (ii) each pivoted on the jointed bridge,
   wherein an end of each of said levers acts upon an annular stop axially displaceable by a rotation of said focusing knob and said stop comprises a conical surface.

6. Binoculars comprising:
   a pair of tubes connected by at least one jointed bridge for adjusting a distance between said tubes;
   a focusing knob;
   focusing elements axially displaceable within each of said tubes;
   focusing gears passing from said focusing knob to respective ones of said pair of tubes through said jointed bridge, said focusing gears (i) each having a two-armed lever acting upon respective ones of said focusing elements and (ii) each pivoted on the jointed bridge, wherein an end of each of said levers acts upon an annular stop axially displaceable by a rotation of said focusing knob; and
   a helical gear operable to cause said axial displacement of said annular stop.

7. The binoculars according claim 6 wherein said helical gear is operated by a rotation of said focusing knob.

8. Binoculars comprising:

a pair of tubes connected by at least one jointed bridge for adjusting a distance between said tubes;

a focusing knob;

focusing elements axially displaceable within each of said tubes; and focusing gears passing from said focusing knob to respective ones of said pair of tubes through said jointed bridge, said focusing gears (i) each having a two-armed lever acting upon respective ones of said focusing elements and (ii) each pivoted on the jointed bridge, wherein one of said two-armed levers is independently displaceable by a diopter gear for diopter adjustment of said binoculars.

9. The binoculars according to claim 8 wherein said focusing gear includes an eccentric and a coupler between said eccentric and each of said two-armed levers.

10. The binoculars according to claim 9 wherein said eccentric is disposed on a shaft which is operated by a connection ensuring a rotation of said shaft in unison with a rotation of said focusing knob.

11. The binoculars according to claim 8 wherein said diopter gear includes an eccentric radially translating a pivoting point of said one of said two-armed levers.

12. The binoculars according to claim 8 wherein said diopter gear includes an eccentric radially translating pivot points of said two-armed levers.

13. Binoculars comprising:

a pair of tubes connected by at least one jointed bridge for adjusting a distance between said tubes;

a focusing knob;

focusing elements axially displaceable within each of said tubes; and focusing gears passing from said focusing knob to respective ones of said pair of tubes through said jointed bridge, said focusing gears (i) each having a two-armed lever acting upon respective ones of said focusing elements and (ii) each pivoted on the jointed bridge, wherein said focusing knob is displaceable in a (i) focusing and (ii) diopter adjustment positions.

14. The binoculars according to claim 13 further comprising a coupling selectively connecting said focusing knob to (i) a gear axially displacing said stop in said focusing position, and (ii) said eccentric shaft in said diopter adjustment position.

15. The binoculars according to claim 14, said coupling including a coupling disk connected to rotate in unison with said focusing knob and selectively connected to rotate in unison (i) at one face of said coupling disk with said gear axially displacing said stop in said focusing position of said focusing knob, and (ii) at a second face of said coupling disk with said shaft in said diopter adjustment position.

16. The binoculars according to claim 15 further including a focusing knob axle affixed to said focusing knob, said focusing knob axle having a splining configured to cause a rotation of said focusing axle in unison with said coupling disk, said coupling disk axially supported on said focusing axle by a s nap connection.

17. Binoculars comprising:

a pair of body tubes each including respective spaced apart rearward and forward arms, the forward and rearward arms of each of said tubes articulably connected to the forward and rearward arms of the other tube along a common joint axis, said arms and body tubes defining, a substantially contiguous opening;

optical focusing elements axially translatable in respective ones of said body tubes;

a focusing knob; and a mechanical coupling transmitting movement caused by rotation of said focusing knob through a pair of said rearward and forward arms to respective ones of said optical focusing elements to cause an axial translation thereof wherein said movement is independent of a relative movement of said body tubes about said common joint axis.

18. The binoculars according to claim 17 wherein said focusing knob selectively cooperates with said mechanical coupling in a diopter adjustment mode of operation to affect an axial translation of one of said optical focusing elements independent of the other optical focusing element.

19. The binoculars according to claim 17 wherein said mechanical coupling comprises respective linkages connecting said focusing knob to respective ones of said optical focusing elements through a respective pair of said rearward and forward arms.

* * * * *